(12) United States Patent
Duksa (10) Patent No.: US 10,539,441 B2
(45) Date of Patent: Jan. 21, 2020

(54) FLOW OR LEVEL SENSOR/SWITCH SYSTEM

(71) Applicant: Thomas Products Ltd., Southington, CT (US)

(72) Inventor: Thomas R. Duksa, Harwinton, CT (US)

( * ) Notice: Subject to any disclaimer, the term of this patent is extended or adjusted under 35 U.S.C. 154(b) by 46 days.

(21) Appl. No.: 15/977,337

(22) Filed: May 11, 2018

(65) Prior Publication Data

US 2018/0348028 A1 Dec. 6, 2018

Related U.S. Application Data

(60) Provisional application No. 62/512,850, filed on May 31, 2017.

(51) Int. Cl.
*G01F 1/20* (2006.01)
*H01H 35/18* (2006.01)
*G01F 23/36* (2006.01)

(52) U.S. Cl.
CPC ............. *G01F 1/20* (2013.01); *G01F 23/363* (2013.01); *H01H 35/18* (2013.01)

(58) Field of Classification Search
None
See application file for complete search history.

(56) References Cited

U.S. PATENT DOCUMENTS

| | | | | |
|---|---|---|---|---|
| 3,381,710 A | * | 5/1968 | Hribar, Jr. ............... | F02K 1/76 137/596.13 |
| 4,522,221 A | * | 6/1985 | Chivens ................... | E04H 4/16 137/118.07 |
| 5,117,693 A | * | 6/1992 | Duksa ..................... | G01F 23/32 340/625 |
| 5,162,624 A | * | 11/1992 | Duksa ................... | H01H 35/405 137/512.1 |
| 5,228,469 A | * | 7/1993 | Otten ..................... | A01G 25/16 137/80 |
| 5,425,271 A | * | 6/1995 | Duksa ..................... | G01F 23/38 116/229 |
| 5,661,238 A | * | 8/1997 | Duksa ..................... | G01F 23/38 116/229 |
| 5,699,995 A | * | 12/1997 | Robertson, III ........ | F16K 1/16 251/129.15 |
| 2018/0261411 A1 | * | 9/2018 | Duksa ................... | H01H 35/405 |

* cited by examiner

*Primary Examiner* — Harshad R Patel
(74) *Attorney, Agent, or Firm* — Alix, Yale & Ristas, LLP (57) ABSTRACT

A flow or level switch comprises a sensor/switch assembly which is adapted for mounting in connection with either a fitting having an offset defining a channel to detect fluid flow through an orifice into the channel or a tank having a ball float to detect the level of the ball float in the tank. A switch module comprises a control rod which reciprocates and activates a switch unit having a bi-positionable contact member. A follower, which may be in the form of an axle with an angularly fixed projection, engages the control rod to cause the contact member to move.

19 Claims, 12 Drawing Sheets

In ref. to 46 "disk"

A. one piece solid bar stock turned to different D/A's and for O-ring in its own groove B. central hole machined and work hardened for smooth action of control rod

FLOW OR LEVEL SENSOR/SWITCH SYSTEM

CROSS-REFERENCE TO RELATED APPLICATION

This application claims the priority of U.S. Provisional Patent Application No. 62/512,850 filed on May 31, 2017, the entirety of which is incorporated herein by reference.

BACKGROUND

This disclosure relates generally to electrical switches. More particularly, this disclosure relates to electrical switches which are responsive to fluid flow in a fluid system.

It is quite conventional to employ electrical switches which are responsive to the flow of a fluid through a conduit of a fluid system. Such switches are employed to regulate the fluid flow to inject various substances into the fluid system and to activate various controls and auxiliary devices. It is very common to employ reed switches and Hall effect sensors for electrical switching functions in fluid flow systems.

Reed switches are relatively sensitive and are prone to failure due to repetitive mechanical shock. In addition, the reed switch cannot typically operate at a substantial current, and is conventionally operated at milliamp level current. Thus, the reed switch operates a small relay which tends to be connected to larger relays. Electrical spikes damage reed-type switches.

The Hall effect-type switch also has some of the same deficiencies. In addition, heat changes the closing/opening range—the so-called pull-in (to close the switch and so-called drop-out when the magnet moves away from the switch. Both the reed switch and Hall effect switch rely on the integrity of the magnetic flux. The contacts in the reed switch due to repetitive opening and closing and the generated heat causes the magnet to diminish and the integrity of the magnetic flux required to replicate the operation to diminish. The magnetic components of the switches commonly may attract various materials which also otherwise detract from reliable operation over time. Ferrous (magnetic) materials build up on the attracting magnet also causes the swinging or motion to jam up in close proximity to the reed switch.

The present disclosure is directed to a flow switch which is not subject to any deficiencies or problems associated with magnetic components or magnetic flux required to effectively operate a conventional switch over an extended lifetime of usage.

SUMMARY

Briefly stated, a sensor/switch assembly, in one embodiment, comprises a fitting having an inlet and an outlet with an offset defining a channel and interiorly having a structure forming an annular orifice so the fluid can communicate from the inlet to the outlet through the orifice and channel. A switch module comprises a controller partially received in the channel. The controller has a shuttle exposed to flow pressure through the orifice and an intermediate collar. A mount assembly is mountable to the offset and slidably receives said controller for reciprocal movement therein. A strong spring exerts a force between the shuttle and the collar, and a weak spring exerts a force between the mount assembly and the collar. A contact module employs a bi-positionable contact member contactable against the first contact or the second contact and has an actuator which is actuatable by a lever to move the contact member. A pivotal follower engages the controller and is pivoted by the position of the controller to displace the lever. When fluid flows from the inlet through the orifice above a flow set point dynamic pressure, the contact member moves to a changed contact position and maintains that changed contact position until the flow pressure is released below the set point.

The depressible actuator is preferably a pin. The lever preferably engages a leaf member. The shuttle optionally comprises a flange or lip engageable with the structure. A threaded cap secures the mount assembly to the offset. The controller is preferably a control rod. The sensor/switch assembly preferably comprises a base which seals against the offset and slidably receives the controller. The pivotal follower preferably comprises an axle and a projection which is angularly fixed to the axle and angularly fixed relative to the lever. The projection is receivable in a slot of the control rod. The contact module generates an electrical output.

In another embodiment, a sensor switch assembly comprises a tank having a ball float. A fitting is mounted to the tank and defines a central bore with a base. A switch module comprises a bracket assembly mounted to the base and engageable against the float. A control member is slidably received in the bore and connectable to the bracket assembly. A mount extends from the fitting and slidably receives the control member for reciprocal movement therein so that the control member extends through the mount assembly. A switch unit sealingly mounted to the mount assembly comprises a bi-positionable contact member contactable against a first contact or a second contact. The switch unit further has an actuator which is actuatable to move the contact member from a first contact position to a second contact position. A pivotal follower engages the control member and is pivoted by the position of the control member to displace the actuator so that when the ball float changes position, the contact member moves from a first contact position to a second contact position.

The bracket assembly is preferably pivotal. The control member comprises an elongated rod. The actuator is a depressible pin. The actuator is actuated by a lever. The lever is pivoted by the follower and engages a leaf. The follower preferably comprises an axle having a projection which is angularly fixed and engages the control member. The switch unit generates an electrical output.

A sensor switch assembly, in another embodiment, comprises a fitting having an inlet and an outlet with an offset defining a channel. The fitting interiorly has a structure forming an annular orifice so that fluid can communicate from the inlet to the outlet through the orifice and channel. A switch module comprises a controller partially received in the channel and having a displaceable shuttle exposed to flow pressure through the orifice and displaceable from the structure. The controller has a first and second intermediate position. A mount assembly slidably receives the controller for reciprocal movement and is mountable to the offset. A spring assembly comprises a strong spring exerting a force between the shuttle and the first intermediate position and a weak spring exerting a force between the mount assembly and the second intermediate position wherein the strong spring force is greater than the weak spring force. A contact module defines a bi-positionable contact member contactable against the first contact or a second contact and having an actuator which is actuatable to move the contact member.

A pivotal follower engages the controller and is transformable by the position of the controller to actuate the actuator. The pivotal follower is preferably received in a slot of the controller and the pivotal position is limited. When fluid flows from the inlet through the orifice above a flow set point dynamic pressure, the contact member moves from a contact position to a changed contact position and an electrical output is transmitted.

The actuator is preferably a depressible pin. The lever engages a leaf member to control the position of the pin.

DETAILED DESCRIPTION

With reference to the drawings wherein like numerals represent like parts throughout the several figures, a flow sensor/switch assembly is generally designated by the numeral 10. The switch functions to change state and generate an electric signal in response to fluid flow. The flow sensor/switch assembly 10 has a compact form which is preferably on the order of a one inch by ¼ inch package and is adaptable for a wide variety of applications.

The flow sensor/switch assembly 10 is preferably employed in liquid level sensing applications for sending a signal by closing or opening a set of contacts when the sensor assembly is mounted at the point of indication at the side of a tank. Alternatively, the micro switch assembly can be modified slightly so the sensor is mounted at the top or bottom of the tank or sump, etc. or is mounted to partially extend into the tank.

The flow sensor/switch assembly 10 is illustrated in conjunction with a globe-style fitting 20 which may be manufactured of metal, although other non-metallic material such as plastic, glass and other materials are possible. The fitting 20 has an inlet and an outlet 22 and 24, respectively, and defines a generally linear flow path 25 therethrough with a transverse inner annular orifice 26. An upper perpendicular offset branch 28 receives the flow sensor/switch assembly 10 which is secured by a threaded cap 30.

The flow sensor/switch assembly 10 comprises an annular base 40 which defines an annular recess 42. The recess receives an O-ring 44 which seals against the interior of the offset branch. A support bonnet 46 of enlarged diameter has a stepped configuration. The base and the stepped disk define a central bore 48 for receiving an axially displaceable control rod 50. The control rod fixedly mounts an intermediate collar 52. A light duty spring 54 engages the underside of the annular base 40 and the collar 52.

The lower end of the control rod 50 mounts a shuttle 60. The shuttle may be secured by a grip ring 61. The shuttle 60 comprises a head 62 of enlarged diameter which forms an optional lip or flange stop against upper edges of the annular orifice 26. The shuttle essentially senses the fluid flow. A heavy duty spring 64 is disposed between the collar 52 and the top 66 of the shuttle. In the FIG. 1 no-flow mode of the switch, the optional head 62 of the shuttle 60 engages against the upper peripheral edge of the annular orifice 26, and there is no-flow from the inlet 22 into the offset branch 28 and through the outlet 24.

Figure 1:
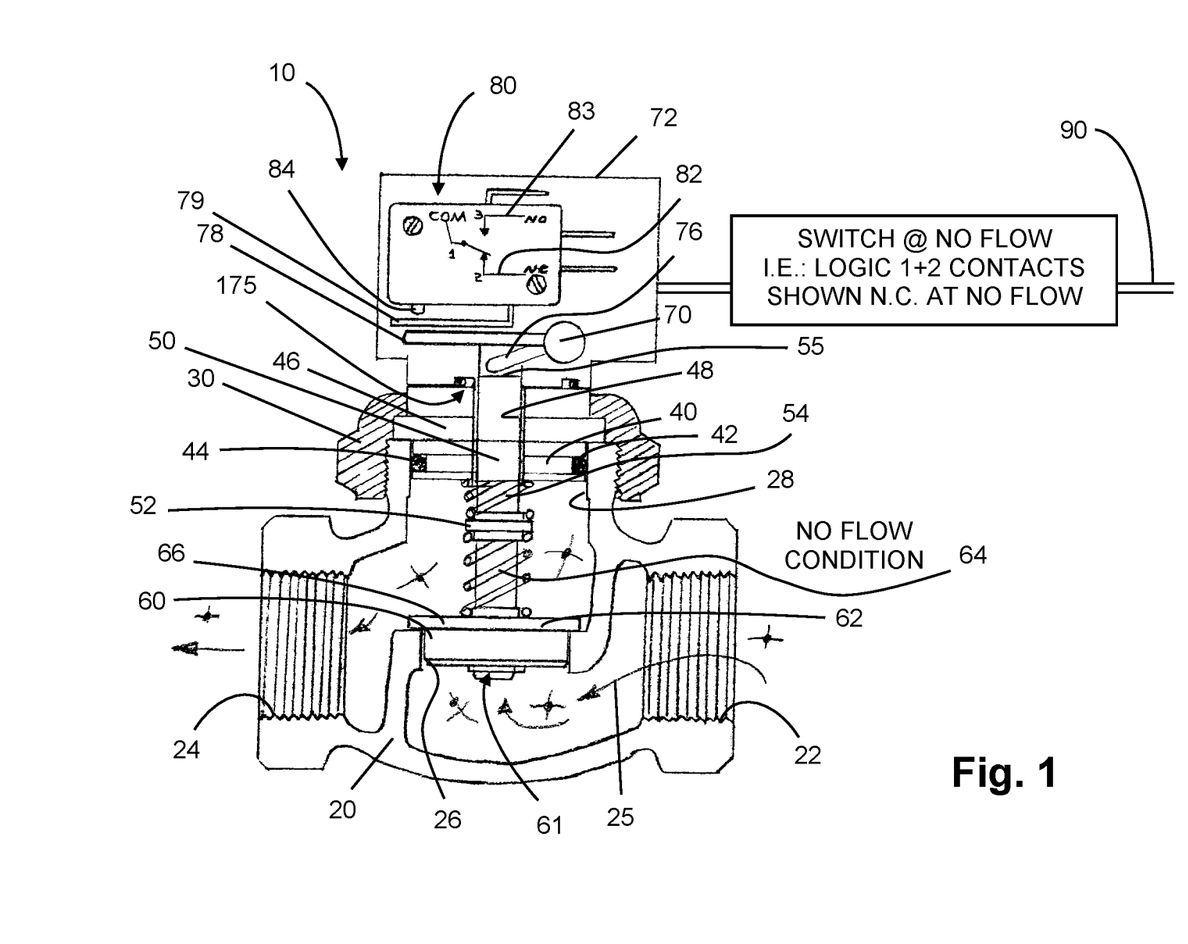
FIG. 1 is an annotated side sectional view, partly diagrammatic and partly in schematic, of a flow sensor/switch in a fluid flow system in a no-flow condition mode of the fluid system.
Figure 1A:
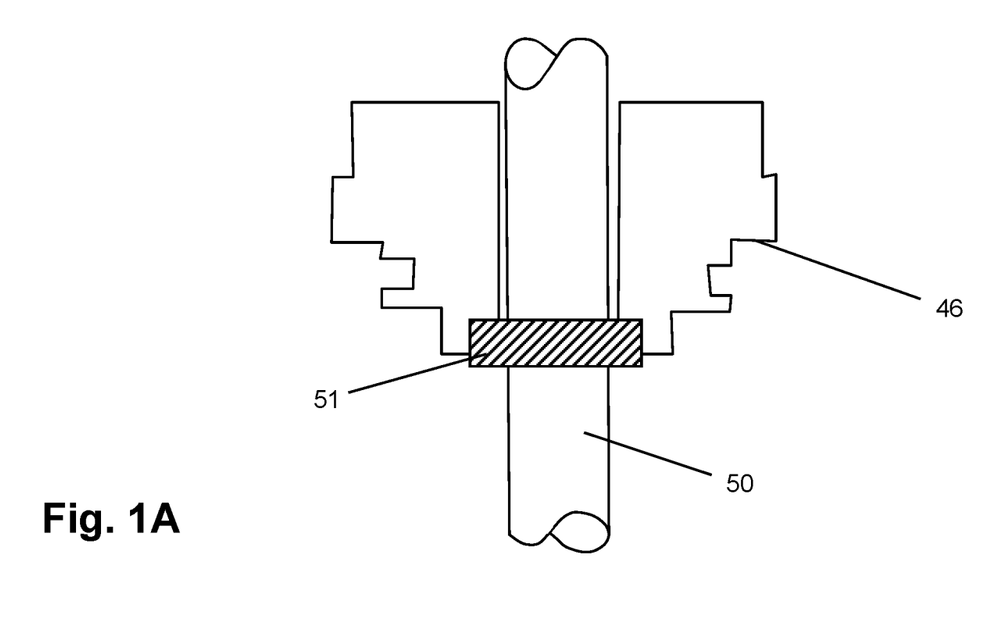
FIG. 1A is an enlarged fragmentary view, portions removed, of an alternative embodiment of the flow sensor/switch of FIG. 1.

In a modified embodiment illustrated in FIG. 1A, an annular wiper seal 51 is inserted into the lower end of bonnet 46 and lightly engages the control rod 50 to prevent particulates from jamming or interfering with the displacement of the control rod 50.

Figure 10A:
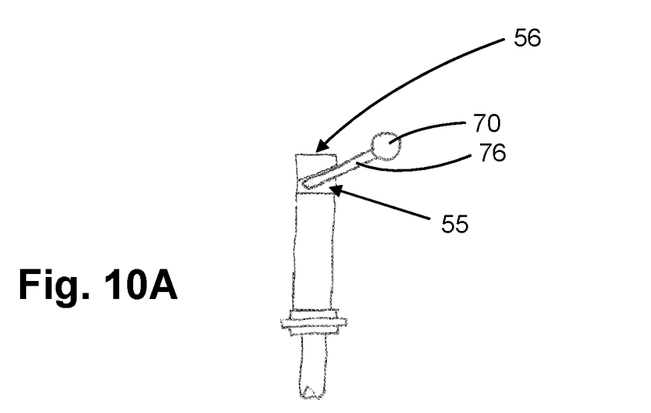
FIG. 10A is a side view of a top portion of a control pin and a control rod and pin interacting with a control pin for the flow sensor/switch system.
Figure 10B:
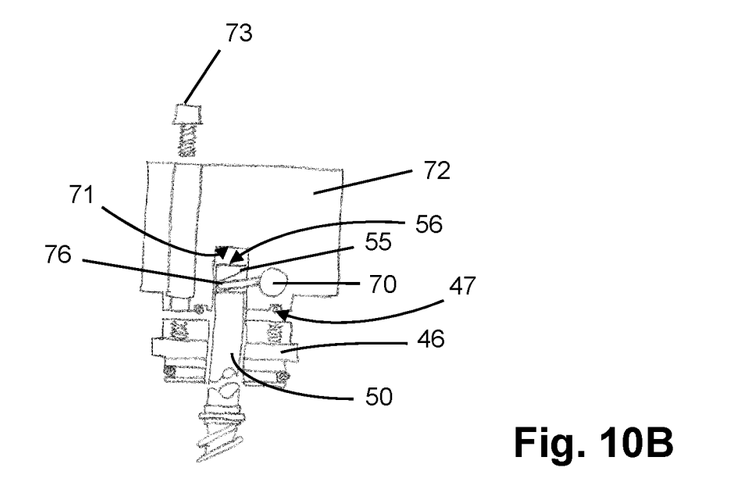
FIG. 10B is a side view, partly in section and partly exploded, of the top of the control rod and the head for the flow sensor/switch system.

With reference to FIGS. 10A and 10B, rotatable control axle 70 is disposed in a head 72 (FIG. 1) secured by screws 73 to the bonnet 46. The head is sealed to the bonnet by an O-ring 47. The head 72 (FIG. 1) essentially forms a housing which may assume a wide variety of forms. The lower end of the head is sealed against the bonnet 46 by O-ring 47. A blind hole 71 in the bottom of the head receives the control rod 50. A rotatable control axle 70 is received in the head. The control axle 70 includes an angularly fixed pin or projection 76 which is received in a slot 55 at the top portion of the control rod and an angularly fixed offset lever 78 (FIG. 1). The axle 70, pin 76 and lever 78 function as a follower with respect to control rod 50.

Figure 2:
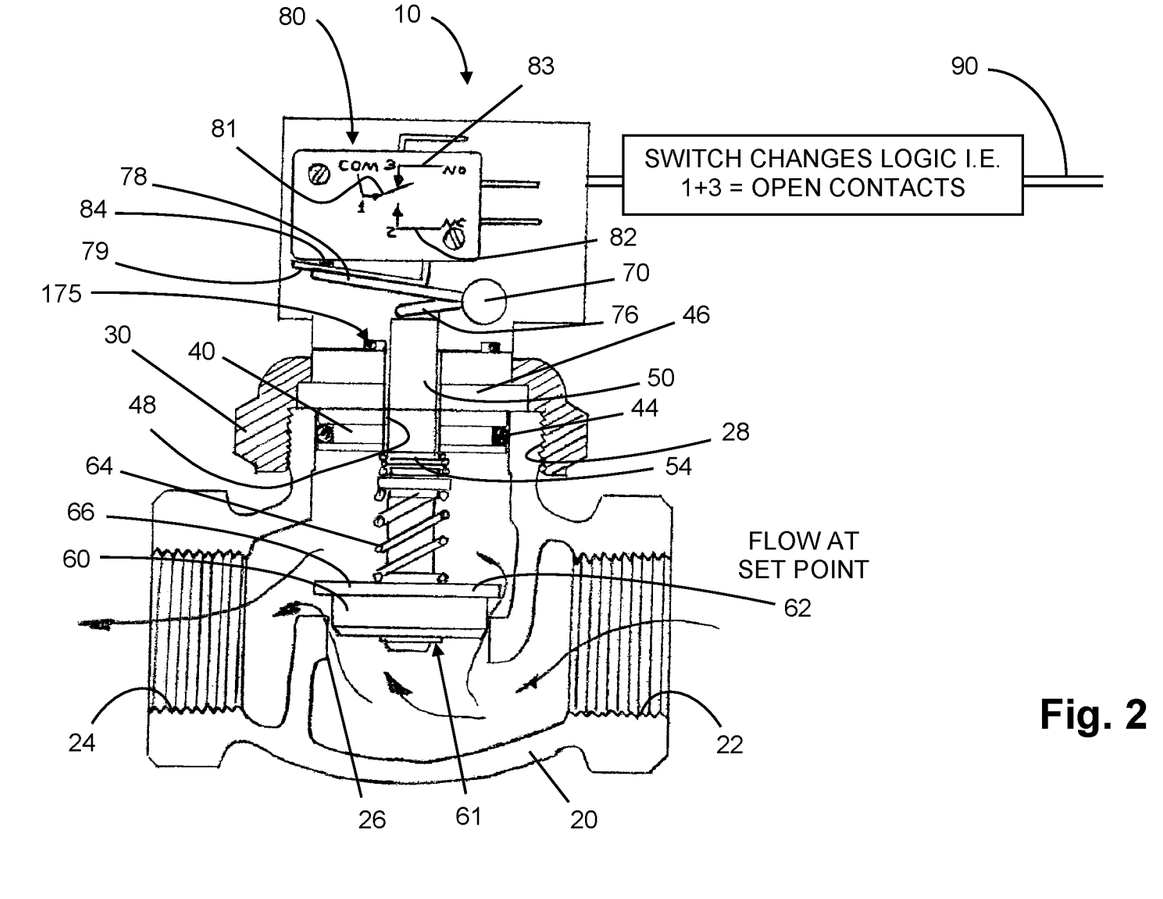
FIG. 2 is an annotated sectional view, partly diagrammatic and partly in schematic, of the flow sensor/switch and flow system of FIG. 1 in a mode wherein the flow is at the set point of the fluid system.
Figure 3:
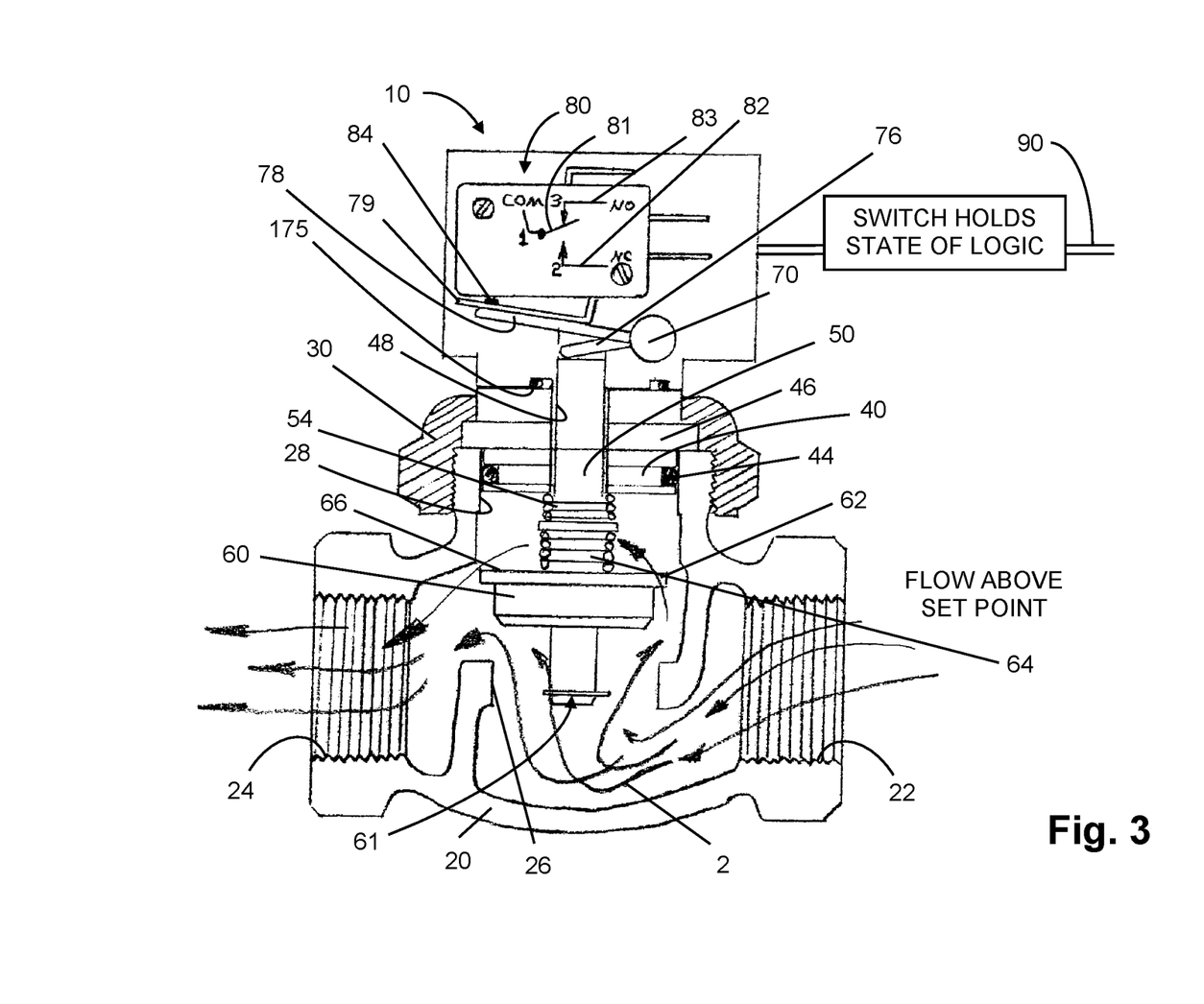
FIG. 3 is an annotated sectional view, partly diagrammatic and partly in schematic, of the flow sensor/switch and flow system of FIG. 1 wherein the flow is above the set point of the fluid system.

With reference to FIGS. 1-3, a switch assembly 80 is housed on the head 72 and includes a bi-positionable contact member 81 which engages against contact 82 or contact 83. The switch lever 78 engages a resilient leaf 79 which depresses a spring-biased pin 84 to thereby force the contact member 81 to the contact mode so that contact member 81 and contact 83 engage to form a conductive path.

As best illustrated in FIG. 2, when the fluid flows at a set point, it flows just past the shuttle 60 and the light duty spring 54 collapses to force the control rod 50 to engage the pin 76 turning control axle 70 to thus pivot lever 78 which engages the leaf 79 to depress the pin 84 and transform the contact from engagement with contact 82 to engagement with contact 83. An electrical signal is transmitted over line 90.

When flow continues to increase and dynamic pressure continues to increase above the set point, such as illustrated in FIG. 3, the switch assembly maintains the state of logic and the contact between points 81 and 83 is maintained.

Upon further increase of flow, control rod 50 has made positive contact with end of blind hole 71 (FIGS. 10-10B) to provide a positive stop and the contacts remain in the described heavy duty spring 64 (FIG. 3) to provide a larger annular orifice space 26 (FIG. 1) for higher flows while the shuttle 60 is out of the flow path, thereby maintaining a low pressure drop.

It will be appreciated that the operation of the flow sensor/switch assembly 10 is essentially mechanical in nature and requires neither magnetic components nor a magnetic flux for operation. When the flow descends to a set point or below for operation or the no-flow state, the control rod 50 descends (or moves inwardly) so that the switch lever 78 and leaf 79 resume the FIG. 1 configuration, and the electrical contact is maintained between contacts 81 and 82.

It should be appreciated that the contacts and circuitry may be configured so that either a signal may be transmitted when there is no flow or a signal may be transmitted when there is flow at the set point or above.

Figure 4:
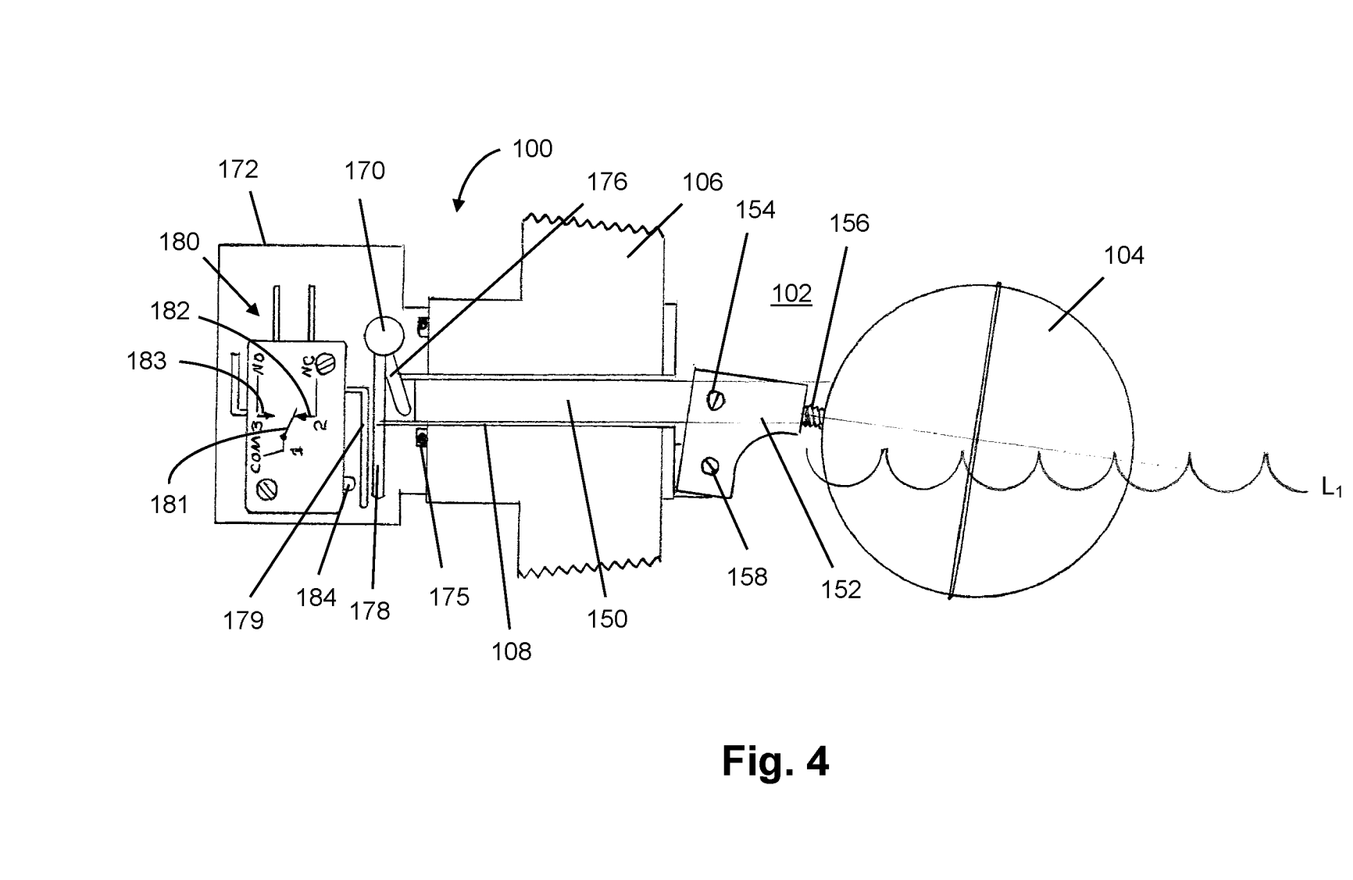
FIG. 4 is a side view, portions broken away and portions in schematic, of a second embodiment of a level sensor/switch mounted to a tank which employs a ball float at a first level indicating a liquid level below the set point wherein pin contact 1 contacts pin 2.
Figure 5:
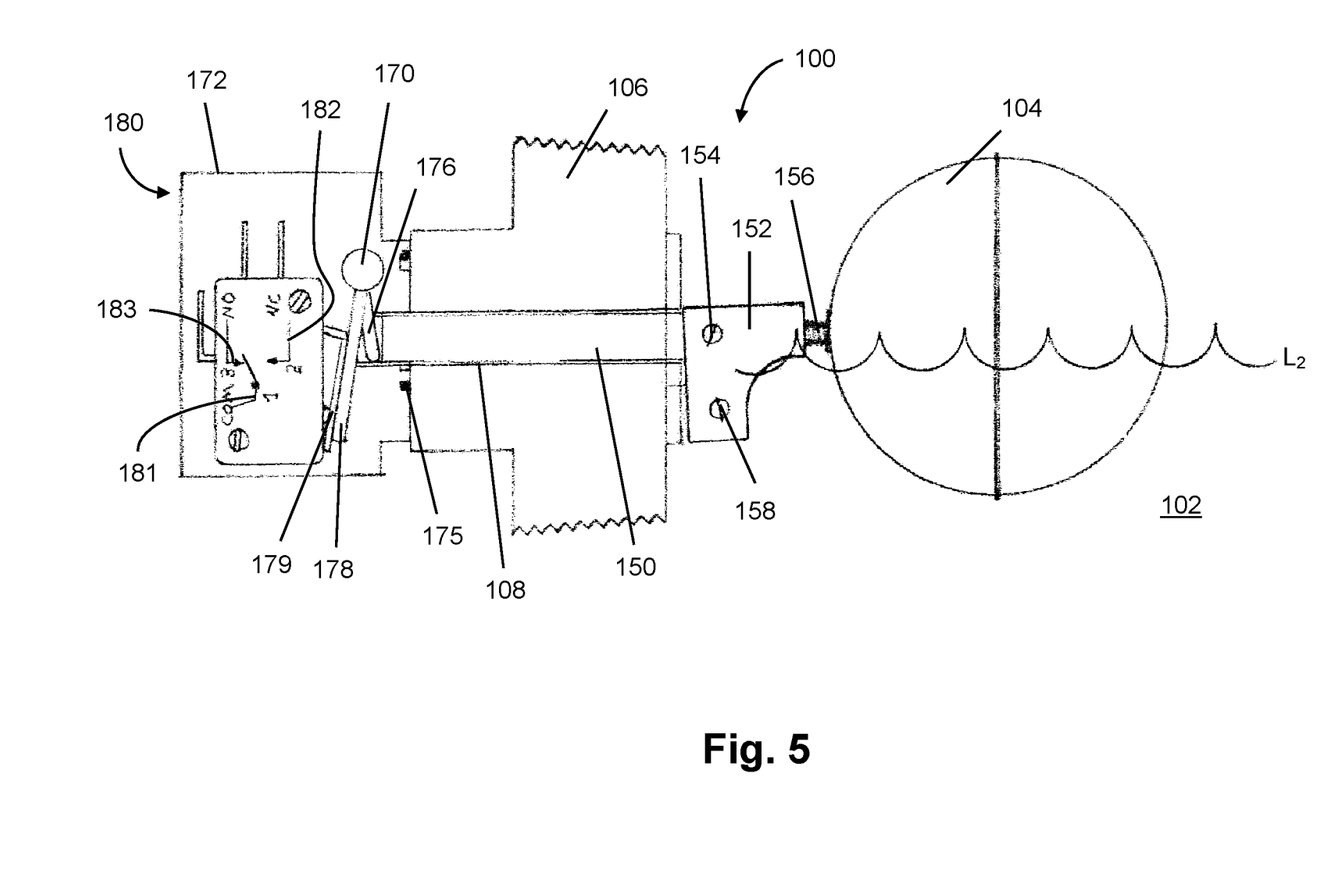
FIG. 5 is a side view, portions broken away and portions in schematic, of the sensor/switch and ball float/tank configuration of FIG. 4 at a second water level, wherein liquid level is raised and the float swings with the raising level to push the control rod actuating the switch to reverse, the toggle closes wherein pin contact 1 contacts pin 3 to indicate the position of the liquid level.
Figure 6:
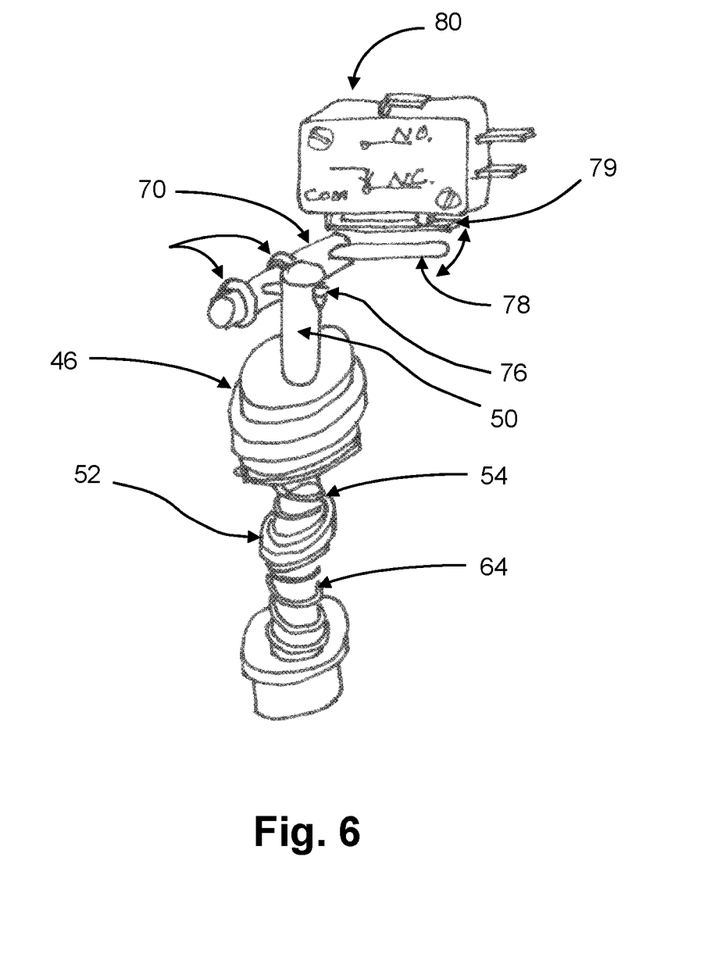
FIG. 6 is a perspective view of the flow sensor/switch system with a head portion removed to further illustrate the construction and operation thereof.
Figure 7A:
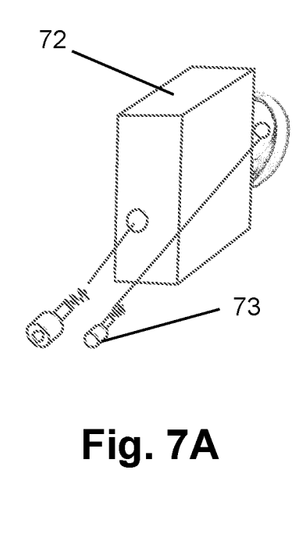
FIGS. 7A and 7B are annotated perspective views of the head portion of the flow sensor/switch system.
Figure 7B:
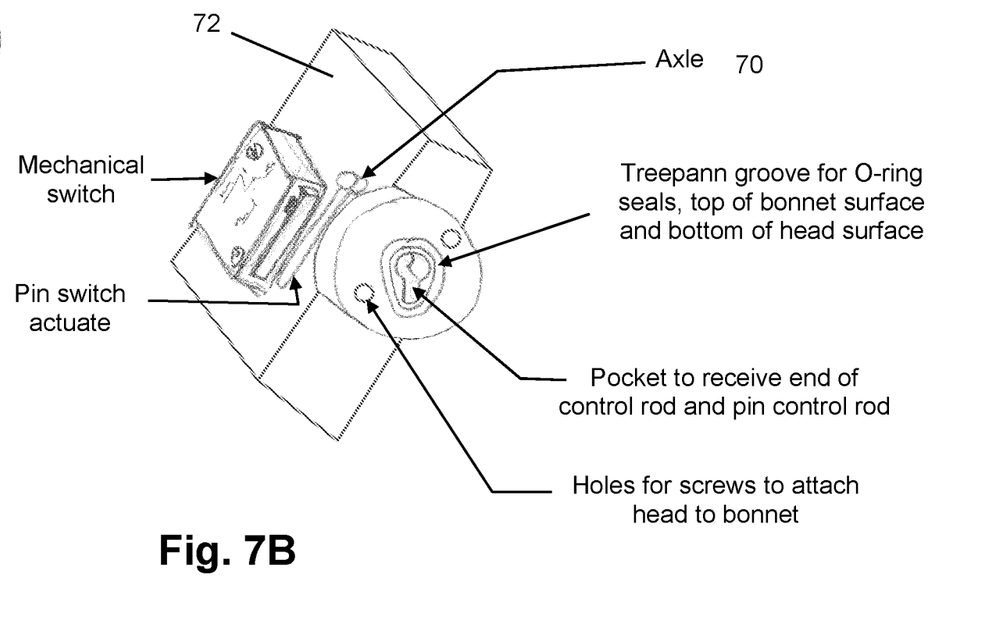
Figures 8A, 8B, 8C:
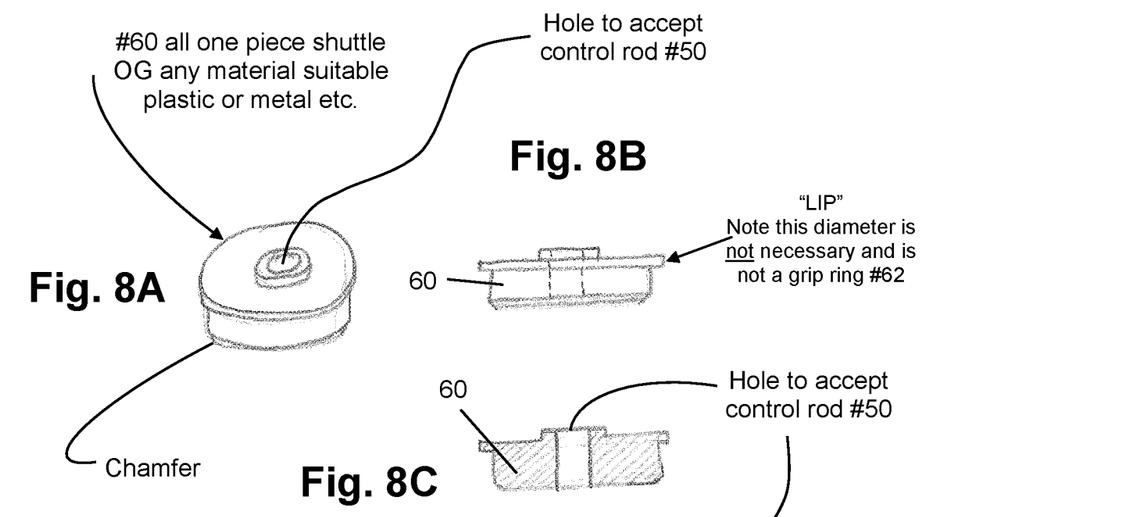
FIGS. 8A-8D are annotated, perspective, side, sectional and alternative sectional views of the shuttle portion of the flow sensor/switch system.
Figure 8D:
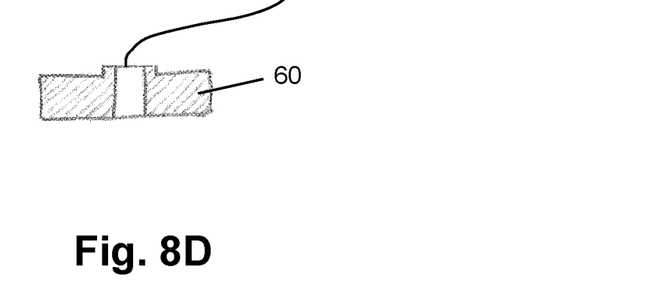
Figure 9A:
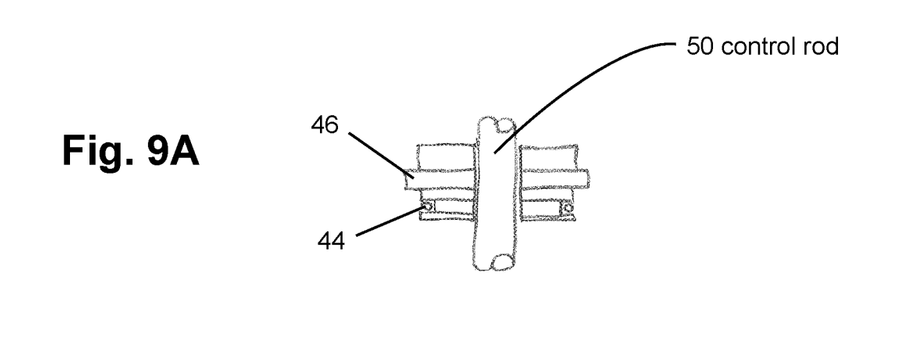
FIGS. 9A and 9B are annotated, side and sectional views of portions of the flow sensor/switch system.
Figure 9B:
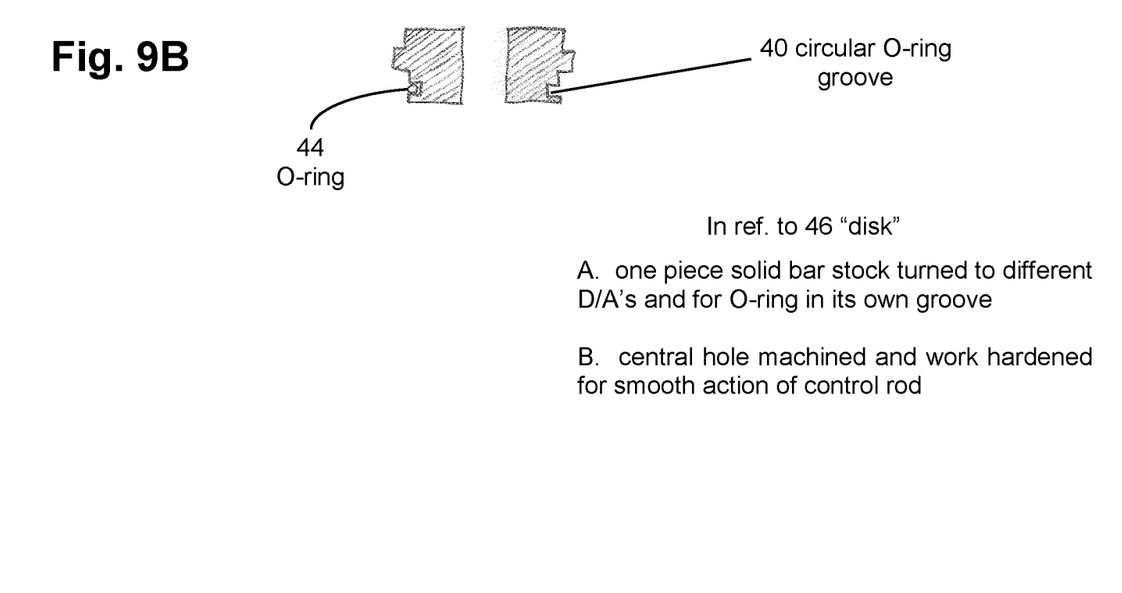
Figure 11:
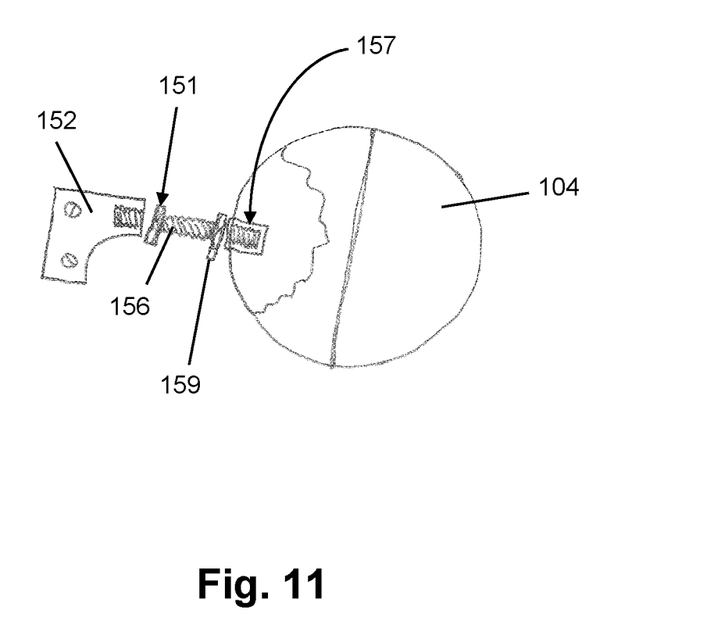
FIG. 11 is a side view, partly in section, illustrating a portion of the sensor/switch system of FIG. 4.

A second embodiment of a level sensor/switch assembly is generally designated by the numeral 100 as illustrated in FIGS. 4, 5 and 11 and is adapted to sense changes in liquid level. Level sensor/switch assembly 100 is mounted to a tank 102 having a cylindrical or spherical or ball float 104 for sensing fluid levels. A fitting 106 is threaded to the tank. Fitting 106 essentially replaces bonnet 46 in FIGS. 1-3. The fitting has a hole 108 which receives a control rod 150. The control rod 150 connects at the tank interior with a pivot bracket 152 which may be secured by a cotter pin 154. With reference to FIG. 11, the pivoted bracket includes an adjustable threaded rod 156 to connect the spherical float. The rod 156 threadably engages an interior spud 157 of the two-inch spherical float 104. A pair of lock nuts 159 jam against the spud and bracket, respectively, to provide housing. The bracket pivots about a pivot pin 158 which is mounted to a support in fixed relationship to the fitting 106.

The control rod 150 reciprocates in accordance with the level in the tank as indicated by the position of the ball float 104. A pivotable pin control axle or axle 170 which is substantially identical in function and form to control axle 70 is disposed in a head 172 and secured by screws 173. The lower end of the head is sealed against the end of the fitting by a sealing ring 175. The pin control axle 170 includes an angularly fixed lever 176 which is engaged into a slot on top of the control rod 150 and an angularly fixed offset lever 178.

A switch assembly 180 is disposed on the head and includes a bi-positional contact member 181 which engages against contact 182 or contact 183 and functions in a similar manner to switch assembly 80 (FIG. 1). The switch lever 178 engages resilient leaf 179 to depress pin 184 which forces the displaceable contact member 181 to the contact mode so that a conductive path between contact member 181 and contact 183 is established. It should be appreciated that switch 100 does not employ the spring assembly as is present in the flow sensor/switch assembly 10.

As best illustrated in FIG. 4, when the level is at a level $L_1$, the control rod 150 extends interiorly into the tank and does not exert a responsive force to displace the lever of the control rod assembly. It will be appreciated that the conductive path remains between contact member 181 and contact 182.

With reference to FIG. 5, when the level increases slightly, the bracket 152 pivots and forces the control rod 150 inwardly (to the left of FIG. 5) so that it engages lever 176 and the angularly fixed offset lever 178 via leaf 179 depresses pin 184. Pin 184 is depressed to switch the contact engagement so that a conductive path is now established between member 181 and contact 183 and an electrical signal is transmitted from the flow sensor/switch assembly 100.

It may be that the change of level in the tank produces waves or ripples which cause the switch assembly 100 to cycle on and off and produce a hysteresis effect between the contacts of the micro switch. To remedy such a situation, it is possible to install an open ended tube (not illustrated) which is placed to extend past the top and the bottom of the float to minimize any waves or ripples surrounding the float. The tube has a slot for the rod 156. It should be appreciated that the switch assembly 100 may also be mounted at the top or bottom or at either side of the tank as required.

Alternate embodiments of the housing for the fitting may be formed from blocks or other configurations and of various materials for receiving the micro switch. The contact logic may also assume various forms and configurations and is preferably spaced above the offset branch end or the exterior tank and secured by a threaded retainer cap.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:
1. A sensor/switch assembly comprising:
   a fitting having an inlet and an outlet with an offset defining a channel and interiorly having a structure forming an annular orifice so that fluid can communicate from said inlet to said outlet through said orifice and channel;
   a switch module comprising:
      a control member partially received in said channel and having a shuttle engageable with said structure and displaceable therefrom and an intermediate collar;
      a mount assembly mountable to said offset and slidably receiving said control member for reciprocal movement therein;
      a spring assembly comprising a first spring exerting a first force between said shuttle and said collar and a second spring exerting a second force between said mount assembly and said collar, said first force being greater than said second force;
      a contact module defining a bi-positionable contact member contactable against a first contact or a second contact and having an actuator which is actuatable by a lever to move said contact member;
      a pivotal follower which engages said control member and is pivoted by the position of said control member to displace said lever;
   so that when fluid flows from said inlet through said orifice above a flow set point dynamic pressure, said contact member moves to a changed contact position and maintains said changed contact position until said flow pressure is reduced below said set point pressure.

2. The sensor/switch assembly of claim 1 wherein said actuator is a pin.

3. The sensor/switch assembly of claim 1 wherein said lever engages a leaf member.

4. The sensor/switch assembly of claim 1 wherein said shuttle comprises a flange engageable with said structure and liftable therefrom.

5. The sensor/switch assembly of claim 1 wherein a threaded cap secures said mount assembly to said offset.

6. The sensor/switch assembly of claim 1 wherein said control member is a control rod having a slot which receives said follower.

7. The sensor/switch assembly of claim 1 further comprising a base which seals against said offset and slidably receives said control member and further comprising a wiper seal disposed between said control member and mount assembly.

8. The sensor/switch assembly of claim 1 wherein said pivotal follower comprises an axle and a lever-like projection which is angularly fixed to said axle and received in a slot of said control member, said projection angularly fixed relative to said lever.

9. The sensor/switch assembly of claim 1 wherein said contact module generates an electrical output.

10. The sensor/switch assembly of claim 1 wherein said actuator is a depressible pin which is displaced by a lever pivoted by said follower.

11. The sensor/switch assembly of claim 10 wherein a lever engages a leaf member to control the position of said pin.

12. A sensor/switch assembly comprising:
a tank having a ball float;
a fitting mounted to said tank and defining a central bore with a base;
a switch module comprising:
   a bracket assembly mounted to said base and engageable against said float;
   a control member slidably received in said bore and connectable to said bracket assembly;
a mount assembly extending from said fitting slidably receiving said control member for reciprocal movement therein so that said control member extends therethrough;
a switch unit sealingly mounted to said mount assembly comprising a bi-positionable contact member contactable against a first contact or a second contact and having an actuator which is actuatable to move said contact member from the first contact position to the second contact position;
a pivotal follower which engages said control member and is pivoted by the position of said control member to displace said actuator;
so that when the ball float changes position, said contact member moves from the first contact position to the second contact position.

13. The sensor/switch assembly of claim 12 wherein said bracket assembly is pivotal.

14. The sensor/switch assembly of claim 12 wherein said control member comprises an elongated rod which defines a slot which receives said follower.

15. The sensor/switch assembly of claim 12 wherein said actuator is a depressible pin.

16. The sensor/switch assembly of claim 12 wherein said actuator is actuated by a lever.

17. The sensor/switch assembly of claim 16 wherein said lever is pivoted by said follower and engages a leaf.

18. The sensor/switch assembly of claim 12 wherein said follower comprises an axle having a projection which is angularly fixed and is received in a slot of said control member and engages said control member.

19. The sensor/switch assembly of claim 12 wherein said switch unit generates an electrical output.

* * * * *